(12) United States Patent
Foster et al.

(10) Patent No.: US 9,618,118 B2
(45) Date of Patent: Apr. 11, 2017

(54) AIR SEAL ASSEMBLY FOR AIRCRAFT FLAP SEAL

(71) Applicant: Alaska Airlines, Inc., Seattle, WA (US)

(72) Inventors: Scott Robert Foster, Federal Way, WA (US); Eiji Sugi, Auburn, WA (US); Harold Demarest, Jr., Auburn, WA (US)

(73) Assignee: Alaska Airlines, Inc., Seattle, WA (US)

( * ) Notice: Subject to any disclaimer, the term of this patent is extended or adjusted under 35 U.S.C. 154(b) by 328 days.

(21) Appl. No.: 14/284,356

(22) Filed: May 21, 2014

(65) Prior Publication Data
US 2016/0186866 A1 Jun. 30, 2016

Related U.S. Application Data

(60) Provisional application No. 61/826,947, filed on May 23, 2013.

(51) Int. Cl.
| | |
|---|---|
| *B64D 47/00* | (2006.01) |
| *F16J 15/02* | (2006.01) |
| *F16J 15/06* | (2006.01) |
| *F16J 15/10* | (2006.01) |
| *B64C 7/00* | (2006.01) |

(52) U.S. Cl.
CPC ............... *F16J 15/027* (2013.01); *B64C 7/00* (2013.01); *B64D 47/00* (2013.01); *F16J 15/061* (2013.01)

(58) Field of Classification Search
CPC ...... F16J 15/027; F16J 15/061; F16J 15/0893; B60J 10/24; B60J 10/30; B60J 10/36; B64C 7/00; E06B 7/2303; E06B 7/2309; B60R 13/06
See application file for complete search history.

(56) References Cited

U.S. PATENT DOCUMENTS

| | | | | |
|---|---|---|---|---|
| 2,891,289 | A | * | 6/1959 | Guilbert, Jr. ............. E06B 7/36 49/493.1 |
| 3,154,311 | A | * | 10/1964 | Gustafson, Jr. ........ F16J 15/061 220/378 |
| 4,527,773 | A | * | 7/1985 | Muller ................... F16K 3/0236 251/306 |
| 4,576,347 | A | | 3/1986 | Opsahl |
| 4,618,109 | A | | 10/1986 | Victor |
| 5,302,065 | A | * | 4/1994 | Vogg .................. B64D 11/0696 411/107 |

(Continued)

*Primary Examiner* — Nicholas L Foster
(74) *Attorney, Agent, or Firm* — Klarquist Sparkman, LLP

(57) ABSTRACT

An air seal assembly for an aircraft control surface comprises a bulb-type air seal, a mounting bracket and a fastener. The bulb-type air seal has a hollow bulb portion, a T-shaped mounting extension, and a first through hole extending through the T-shaped mounting extension. The mounting bracket has a T-shaped channel configured to slidingly receive the T-shaped mounting extension of the air seal and a second through hole. The fastener has a head at one end and an opposite exposed end sized for extending through the first through hole in the T-shaped mounting extension and through the second through hole in the mounting bracket. The exposed end is accessible to tighten the fastener against the bracket to keep the air seal in place within the T-shaped channel.

11 Claims, 4 Drawing Sheets

(56) References Cited

U.S. PATENT DOCUMENTS

| | | | | |
|---|---|---|---|---|
| 5,681,013 A | * | 10/1997 | Rudolph | B64C 9/24 |
| | | | | 244/214 |
| 5,749,546 A | * | 5/1998 | Blackner | B64C 3/50 |
| | | | | 244/199.1 |
| 6,073,889 A | | 6/2000 | Dees et al. | |
| 6,386,619 B1 | * | 5/2002 | Tsuchida | B60J 10/86 |
| | | | | 296/146.9 |
| 6,588,768 B1 | * | 7/2003 | Janich | F16J 15/061 |
| | | | | 277/637 |
| 7,611,099 B2 | | 11/2009 | Kordel et al. | |
| 2002/0005461 A1 | * | 1/2002 | Nettle | B64C 3/48 |
| | | | | 244/214 |
| 2003/0066933 A1 | * | 4/2003 | Maury | F16J 15/027 |
| | | | | 244/130 |
| 2004/0079032 A1 | * | 4/2004 | Russell | F16J 15/027 |
| | | | | 49/498.1 |
| 2008/0000236 A1 | * | 1/2008 | Grammel | F16J 15/0893 |
| | | | | 60/770 |
| 2009/0079141 A1 | * | 3/2009 | Qiang | F16J 15/027 |
| | | | | 277/650 |
| 2010/0327121 A1 | * | 12/2010 | McAlinden | B64C 7/00 |
| | | | | 244/215 |
| 2014/0026719 A1 | * | 1/2014 | Stanfield | B25B 23/0085 |
| | | | | 81/13 |
| 2014/0345199 A1 | * | 11/2014 | Yahata | B64C 1/14 |
| | | | | 49/475.1 |
| 2015/0266563 A1 | * | 9/2015 | Zeon | B64C 1/38 |
| | | | | 244/130 |

* cited by examiner

VIEW A-A

VIEW B-B

VIEW A - A

AIR SEAL ASSEMBLY FOR AIRCRAFT FLAP SEAL

CROSS REFERENCE TO RELATED APPLICATION

This application claims the benefit of U.S. Provisional Patent Application No. 61/826,947, filed May 23, 2013, which is hereby incorporated by reference.

FIELD

This application relates to aircraft, and particularly to an aircraft flap seal and seal retainer assembly.

BACKGROUND

Modern aircraft have a variety of flight control surfaces that can be controlled to maneuver the aircraft in flight. Seals are often provided at edges of movable flight control surfaces where they intersect with adjacent surfaces to reduce aerodynamic drag and noise.

One such type of flight control surface is the flaps on a passenger jet aircraft. Such aircraft are typically fitted with one or two sets of flaps on the trailing edge of each wing. These flaps are extendable along a direction of air flow over the wing. To reduce drag and noise caused by air rushing past the junctions of the flaps with the adjacent surfaces of the wings, bulb seals are provided at one of more edges of the flaps. Each bulb seal is made of a resilient material designed to be compressed by contact with another object when it is in its sealing position.

In conventional installations, the bulb seal is coupled to a bracket which is in turn mounted to the aircraft with screws or other suitable fastening arrangement. The bracket has a channel, and the seal has a corresponding mounting portion shaped to be slid into the channel for mounting. To prevent the seal from migrating out of the channel, it is fixed in place, typically using safety wire that must be threaded through holes in the seal and the bracket and then twisted together like a bread tie.

Over time, this safety wire connection tends to wear and eventually breaks, typically without notice. When a broken safety wire on an air seal is observed, it can be cause for a flight delay, which is very expensive.

SUMMARY

Described below are implementations of a new air seal assembly and methods that address drawbacks of the prior art.

According to one implementation, an air seal assembly for an aircraft control surface comprises a bulb-type air seal, a mounting bracket and a fastener. The bulb-type air seal has a hollow bulb portion, a T-shaped mounting extension, and a first through hole extending through the T-shaped mounting extension. The mounting bracket has a T-shaped channel configured to slidingly receive the T-shaped mounting extension of the air seal and a second through hole. The fastener has a head at one end and an opposite exposed end sized for extending through the first through hole in the T-shaped mounting extension and through the second through hole in the mounting bracket. The exposed end is accessible to tighten the fastener against the bracket to retain the air seal in place within the T-shaped channel.

In some implementations, at least the bulb portion of the air seal is formed of a resiliently deformable material.

The fastener can be a threaded bolt, and the assembly can also comprise a nut sized to threadedly engage the bolt at the exposed end when the bolt is positioned to extend through the first through opening in the mounting extension and the aligned second through opening in the mounting bracket so that the nut can be tightened against the mounting bracket.

In some implementations, the bolt and nut are tightenable without accessing the head of the bolt, including, e.g., by holding the exposed end of the bolt and tightening the nut relative to the exposed end. In some implementations, the exposed end of the bolt has a recess shaped to receive a hex key for holding the bolt during tightening of the nut.

In some implementations, the fastener comprises a fastening pin having the head and a collar having a nut, and wherein the nut is configured to separate from the collar after the collar is tightened against the mounting bracket to a predetermined preload specification.

In some implementations, the mounting bracket has a right-angle flange cross-section. The mounting bracket can comprise an attachment flange having a series of spaced apart slotted openings dimensioned to receive fasteners for attaching the air seal assembly to an aircraft.

In some implementations, the assembly comprises a filler plate dimensioned to fit within the hollow bulb portion and having a third through hole alignable with the first through hole in the mounting extension. The through hole in the filler plate can be countersunk to accommodate the head of the fastener and sized to receive the fastener. The filler plate and the mounting bracket are each formed of a relatively rigid material, and wherein the bulb seal is formed of a resilient material, and wherein the arrangement of the fastener, filler plate, air seal and mounting bracket allows the air seal to be securely fastened to the bracket without causing damage to the resilient material of the air seal.

According to a method implementation, a method of installing an air seal assembly for an aircraft control surface comprises providing an elongate air seal having a bulb, providing a retainer bracket having at least one open end shaped to slidingly receive the elongate air seal, forming a hole in the retainer bracket, sliding the retainer bracket over an end of the elongate air seal and aligning the hole in the retainer bracket with a selected position for a hole in the elongate air seal. The hole in the retainer bracket is then used as a guide to drill a hole in the elongate seal at the selected position into an interior of a hollow space defined within the bulb. The method also can include accessing the interior space and inserting a fastener through the hole in the elongate air seal and the hole in the retainer bracket and tightening a nut on an exposed end of the fastener to tighten the fastener against the elongate air seal and the retainer bracket.

In some implementations, providing an elongate air seal comprises reusing an installed elongate air seal by removing any existing security wire from one end of the elongate air seal and removing any existing retainer bracket.

In some implementations, the method further comprises mounting the retainer bracket to the aircraft by installing fasteners through a mounting flange of the retainer bracket.

These and other implementations are described herein with reference to the accompanying drawings.

DETAILED DESCRIPTION

Figure 1:
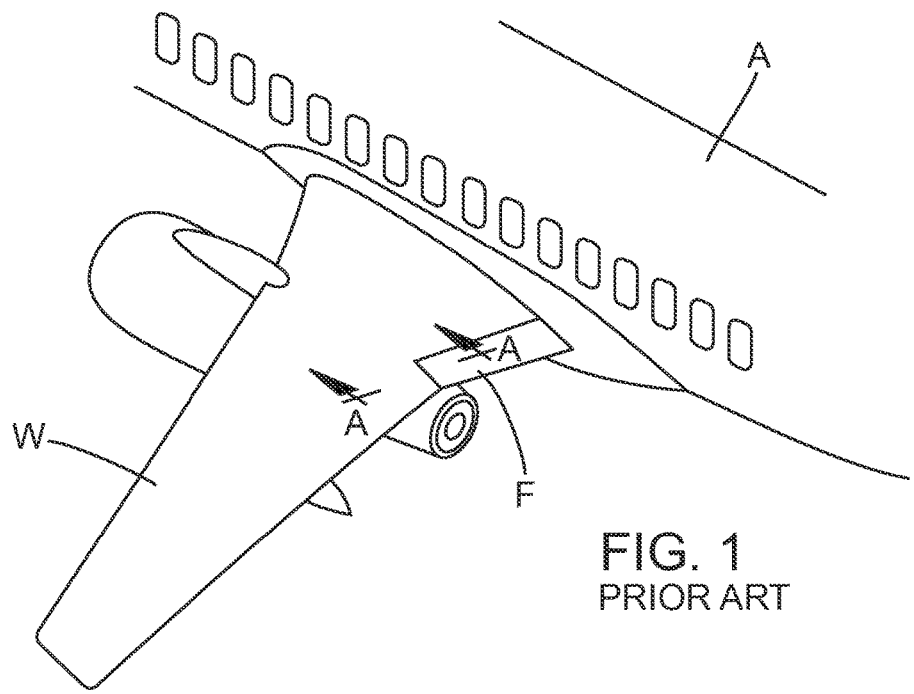
FIG. 1 is a partial perspective view of an aircraft showing a portion of its fuselage and left wing, and of particular interest, flaps on the trailing edge of the wing.
Figure 2:
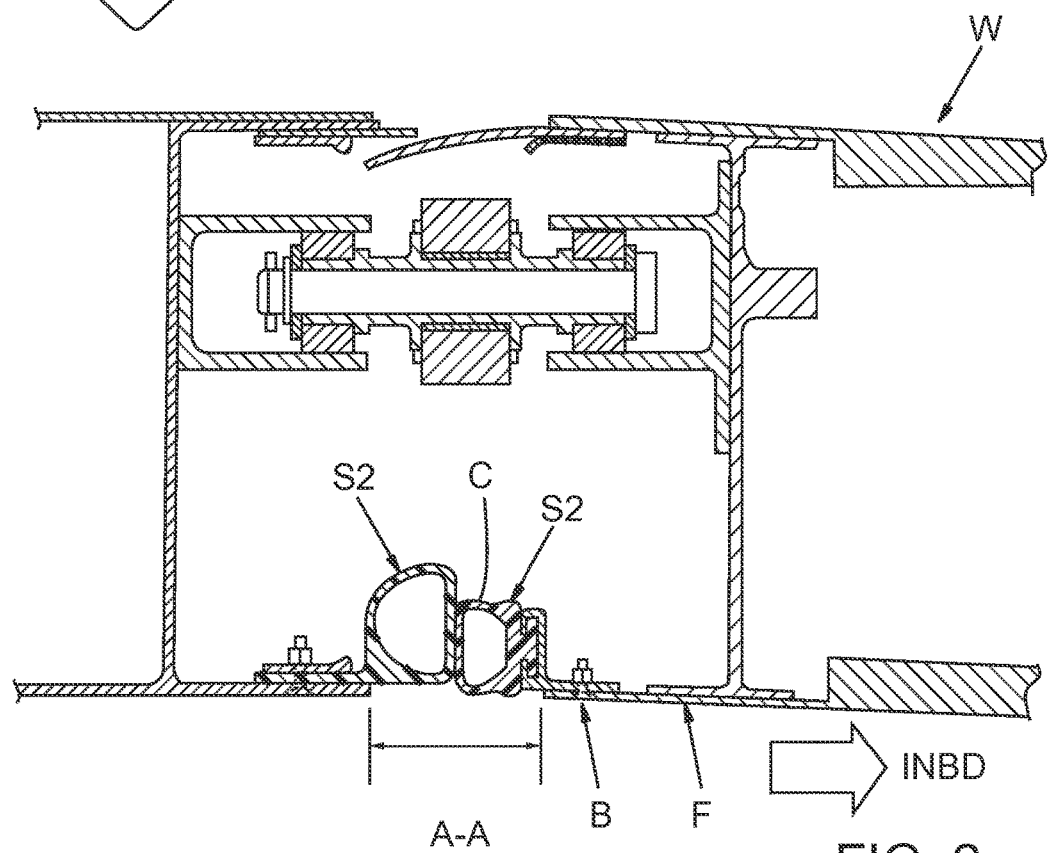
FIG. 2 is a section view approximately along the lines A-A in FIG. 1 and showing the inboard and outboard flaps and their respective flap seal mounting arrangements.

FIG. 1 is a perspective view of a portion of a conventional aircraft showing the left wing and one of the flight control surfaces (specifically, the inboard flap F) that are used to fly the aircraft. FIG. 2 is a section view taken approximately along the lines A-A and looking forward in FIG. 1, showing the inboard flap F and its air seal S1 at the lower edge of the flap F. The air seal S1 has a bulb portion C that is deformed by contact with another structure, such as the adjacent seal S2 shown in FIG. 2. The seal S1 is attached to the flap F with a bracket B, as described in more detail below.

Figure 3:
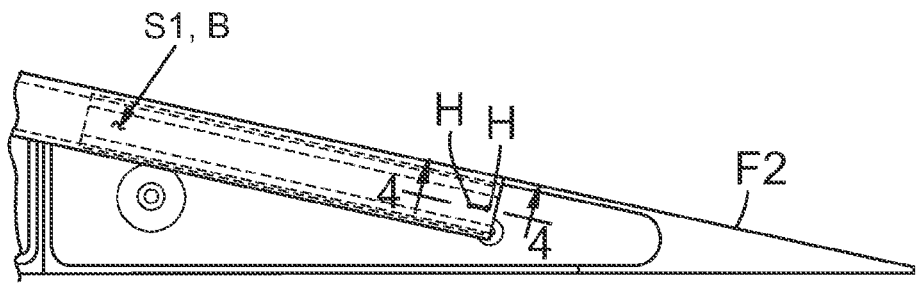
FIG. 3 is a side section view of another installation showing an inboard flap seal and its conventional mounting bracket.
Figure 4:
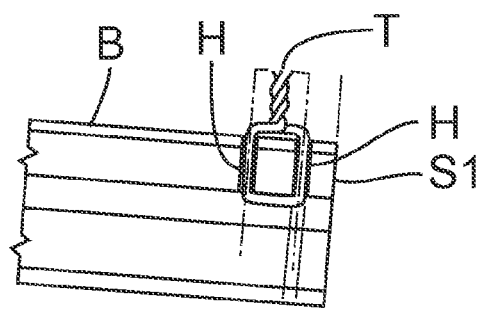
FIG. 4 is an enlarged portion of a side section view similar to FIG. 3, except showing the seal secured to the conventional mounting bracket with twisted safety wire.

FIG. 3 is side section view of a portion of another flap F2 showing the length of the seal S1 and the bracket B. The seal S1 is received within a channel of the bracket B. Near the aft end of the seal, there is a pair of holes H, H. FIG. 4 is a section view taken along the lines 4-4 in FIG. 3 that shows a portion of the seal S1 and the bracket B. As shown in FIG. 4, the conventional approach to keeping the seal S1 in place within the channel of the bracket B is with a piece safety wire T having its ends twisted together (like a bread tie). Specifically, the safety wire is threaded through the pair of holes H, H in the seal S1 and aligned holes in the bracket B.

Installing the safety wire is difficult and time consuming. For example, after the wire is passed through the first pair of aligned holes, then passing it through the second pair of aligned holes can be difficult because it must undergo a change in its path of about 180 degrees over a very short distance. In addition, this change of path occurs within the hollow bulb section of the seal S1, which further limits a worker's ability to manipulate the wire. If the wire ends are twisted together with a hand tool, it can be difficult to achieve the appropriate torque necessary to secure the ends together but not create undue stress that may cause the resulting joint to break prematurely. Even if installed properly, the safety wire joint is subject to failure at inopportune intervals, which can allow the seal to migrate within the channel and thus require repair. Such required repairs can cause flights delays, which are very costly and disruptive.

Figure 5:
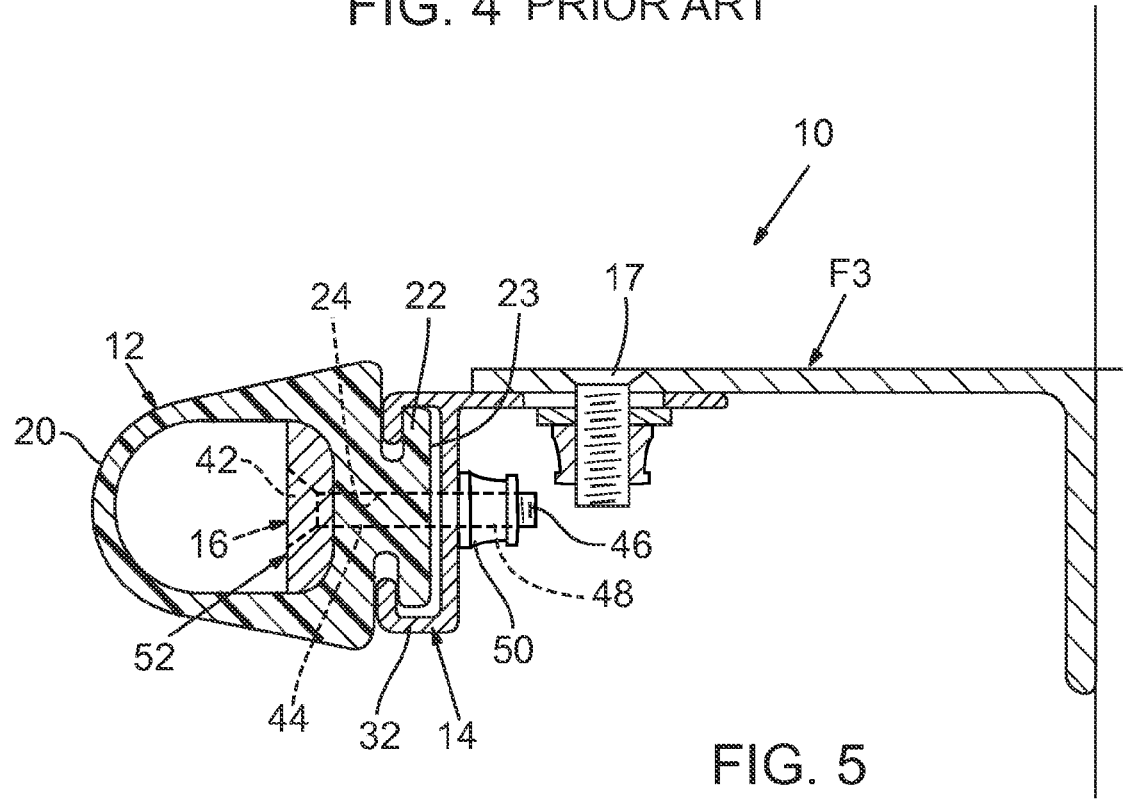
FIG. 5 is an end view of the new bulb seal assembly showing the new mounting bracket and fastening arrangement.

FIG. 5 is an end view of a new air seal assembly 10, which is shown in this example as installed on a flap F3. The new assembly includes a bulb seal 12 secured to a mounting bracket 14 with a fastener 16. The mounting bracket 14 is in turn attached to the flap F or other surrounding structure by one or more fasteners 17. The mounting bracket 14 is preferably an aluminum extrusion, but other suitable materials can also be used. The new air seal assembly provides for a more robust mounting that retains the air seal in place more securely, thus reducing service needs and minimizing delays and downtime caused by loose seals.

The bulb seal 12 has a hollow bulb portion 20 that is configured to be resiliently deformable by contact with another object, such as when the flap F3 is moved into place. In this way, the seal 12 can be configured to block air flow as desired, such as through joints and seams.

The bulb seal has a mounting extension 22 along at least a portion of its length and having a suitable cross section, such as a "T" shape cross section as shown. There is a through hole 24 extending from a side of the mounting extension 22 within the hollow bulb portion 20 to its exposed external side 23. Desirably, only a single hole in the seal 12 is required at each mounting location.

As shown, the bracket 14 can have a channel 32 shaped to receive the mounting extension 22. In the illustrated implementation, the channel 32 has a shape corresponding to the mounting extension 22 (e.g., a T-shape) such that the seal 12 is installed in the bracket 14 by aligning it with the channel 32 and sliding it longitudinally into the channel 32.

The fastener 16 is positioned in the through hole 24 to secure the bulb seal 12 to the bracket 14. In some embodiments, a through hole 56 (FIG. 6) is provided in the bracket 14 before assembly (or is made during assembly). In some embodiments, the fastener 16 is a threaded fastener having a body 44 with a threaded section or shaft 48. In some embodiments, the fastener 16 is a threaded bolt and there is a threaded nut 50 that is tightenable over the exposed end of the fastener 16 to secure the fastener 16 and the seal 12 to the bracket 14.

In the illustrated implementation, the fastener 16 has a head 42 that is sized larger than the through hole 24. In the illustrated implementation, there is also a filler plate 52 positioned between the fastener 16 and the mounting extension 22. The fastener or the fastener/filler plate combination is positioned near an open end of the bulb portion 20, and thus is possible to insert the fastener or fastener/filler plate combination into the open end and with the fastener 16 extending through the through hole 24 to define an exposed end 46 of the fastener 16.

Figure 6:
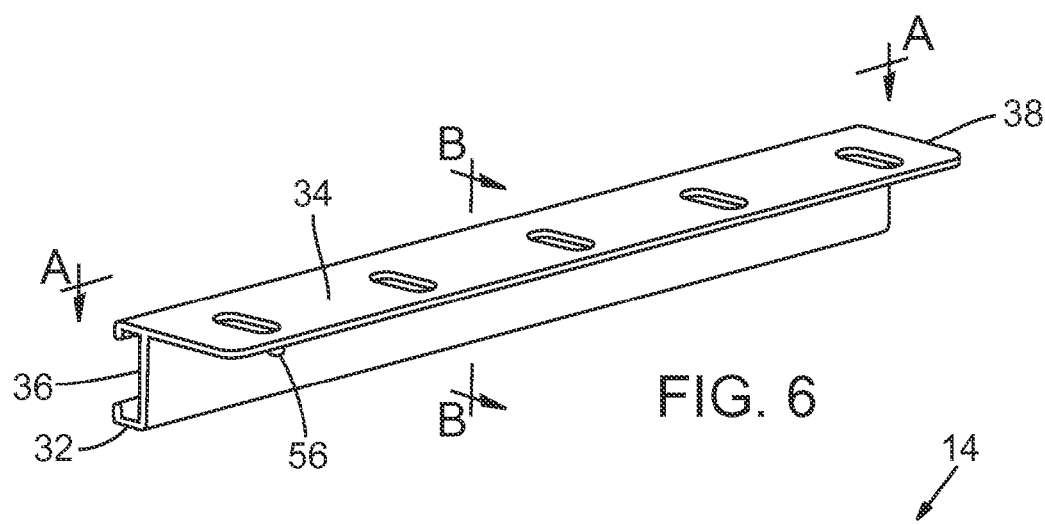
FIG. 6 is a perspective view of the new bulb seal mounting bracket.
Figure 7:
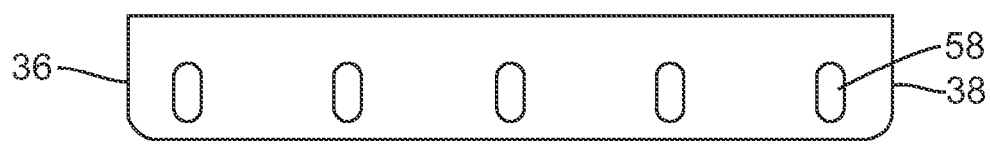
FIGS. 7 and 8 are top plan and side elevation views, respectively, of the mounting bracket of FIG. 6.
Figure 8:
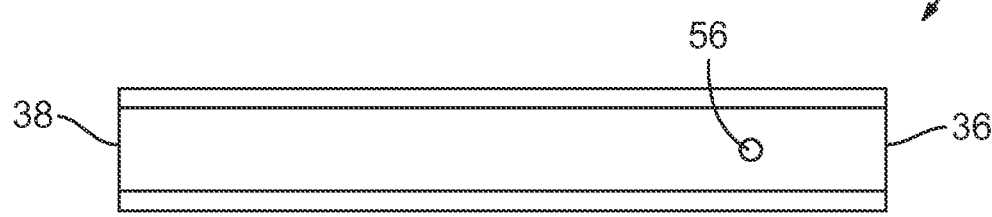

FIGS. 6, 7 and 8 are perspective, top plan and side elevation views, respectively of the bracket 14, also sometimes referred to as a retainer bracket. As shown, the bracket 14 can have a flange 34 extending at least partway between its first end 36 and second end 38 and having one or more mounting holes 56 to secure the bracket to the flap F or other surrounding structure, such as with one or more fasteners 17. In a typical implementation, the mounting hole(s) 56 are located from about 0.3 in to about 1.5 in from an end of the seal 12/bracket 14.

Figure 9:
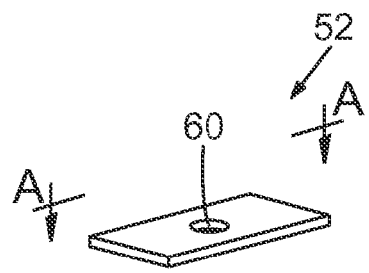
FIG. 9 is a perspective view of the filler plate used with the new bulb seal assembly.
Figure 10:
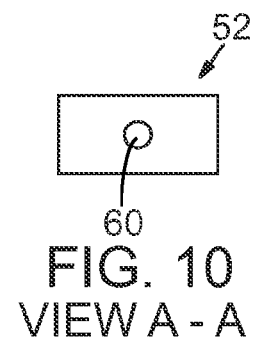
FIG. 10 is a top plan view of the filler plate of FIG. 9.

FIG. 9 is a perspective view of the filler plate 52. As shown, the filler plate 52 can be generally rectangular and have a through hole 60 provided as shown. The through hole 60 may be countersunk as desired to accommodate the head 42 of the fastener 16. If provided, the filler plate 52 provides a relatively rigid surface against which to tighten the fastener 16 and any nut 50 that is present. Because the bulb portion 20 is made of a resilient or deformable material, it may not withstand the forces exerted by the fastener 16 during tightening, so the filler plate 52 can be introduced as necessary to provide a broader and more rigid clamping surface. In the illustrated implementations, the filler plate 52 is formed of aluminum, although other suitable materials could be used.

In some implementations, the fastener 16 is tightenable from its exposed end 46, i.e., it is not necessary to access the head 42 of the fastener 16 to tighten it. Thus, e.g., the exposed end 46 can be grasped with a tool or otherwise held while the nut 50 is tightened. This allows for achieving a proper assembly faster and more reliably.

Figure 11A:
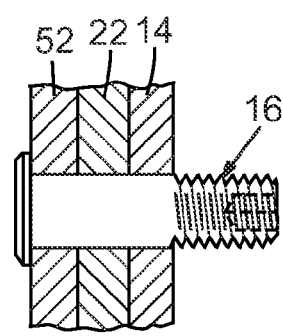
FIGS. 11(a) to 11(d) are sectional views of an exemplary fastening arrangement showing a fastener being assembled through the bulb seal and mounting bracket.
Figure 11B:
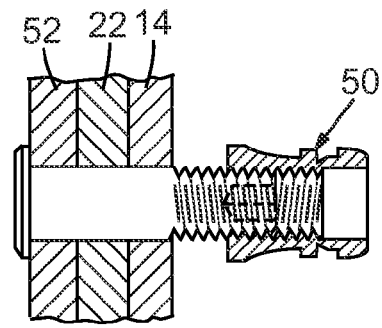
Figure 11C:
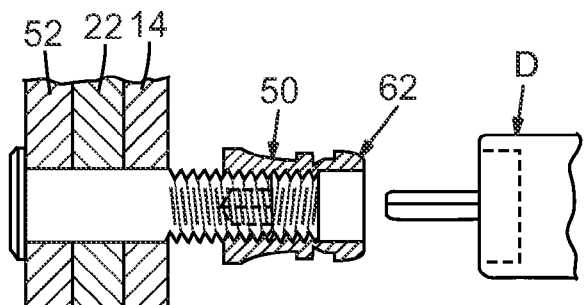
Figure 11D:
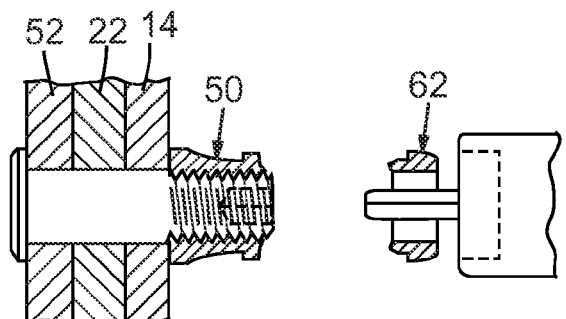

FIGS. 11(a)-11(d) are simplified section views showing assembly and use of one suitable fastener 16 and nut 50. In FIG. 11(a), the fastener 16 is inserted through the optional filler plate 52, mounting extension 22 and the bracket 14. In FIG. 11(b), the nut 50 is threaded onto the exposed end 46 of the fastener 16. In FIG. 11(c), a tool D is used to drive an installation part (or collar) 62 of the nut 50 and tighten it against the bracket 14 (FIG. 11(d)). In the illustrated example, the tool has a bit H designed to engage a recess in the exposed end 46, such as a hex-shaped recess. After a predetermined torque is reached with the tool, the installation part 62 is sheared off, leaving the nut 50 fully tightened to a predetermined tightening force.

One suitable type of fastener is a Hi-Lok® fastener sold by Hi-Shear Corporation or a HuckBolt® fastener sold by Alcoa Corporation. It is also suitable to use a blind bolt, a blind rivet or any other suitable type of fastener. In some applications, it may be possible to use a screw instead of a bolt or other fastener requiring tightening from the mounting bracket side.

According to an exemplary method of installation of the new seal assembly (or new retainer), the following steps are completed:

(1) the existing conventional safety wire T (or any remaining portion) is removed to allow the conventional bracket B to be removed from the seal S.

(2) the new mounting bracket 14 is slid over the free end of the seal S.

(3) using the through hole 56 in the mounting bracket 14 as a guide, a suitable hole is drilled in the mounting extension of the seal S.

(4) from the end of the seal S, a fastener (or a fastener and filler plate) is inserted such that the end of the fastener protrudes through the mounting extension.

(5) the exposed end of the fastener is positioned to protrude through the through hole 56 in the bracket 14.

(6) a nut 50 is threaded onto the exposed end of the fastener.

(7) the nut 50 is tightened to a predetermined torque.

(8) the position of the seals is adjusted as necessary to coordinate with proper operation of the flaps.

Thus, the described approach uses a fastener requiring only a single hole to be made in the seal. Further, the fastener is relatively easy to position through the open area of the bulb portion of the seal, and it can be tightened from the exposed end of the fastener without requiring access to its head. Moreover, the resulting attachment is more secure, particularly when a filler plate is used to provide a rigid clamping surface protecting the seal against the tightening force exerted by the fastener. The new mounting arrangement can be used at one end of the seal, or at multiple locations along the length of the seal.

Results

Available internal records show that since about November 2011, approximately seventeen flap seals constructed according to the prior art design have required service.

The assignee has modified a majority of its 737-NG aircraft to have the new air seal assembly. As of the filing date of this application, and based on a survey of the applicable part numbers, no problems with the new air seal assembly have been reported. In addition, none of the new air seal assembly installations has required service or replacement parts.

In view of the many possible embodiments to which the principles of the present disclosure can be applied, it should be recognized that the illustrated embodiments are only examples and should not be taken as limiting the scope of the following claims. We therefore claim all that comes within the scope and spirit of these claims.

We claim:

1. An air seal assembly for an aircraft control surface, the air seal assembly comprising:
a resiliently deformable non-metallic bulb-type air seal having a hollow bulb portion that is continuous in cross-section around a hollow space, a T-shaped mounting extension that is monolithically formed with the hollow bulb portion, and a through hole extending through the T-shaped mounting extension;
a filler plate fit within the hollow space of the hollow bulb portion and having a through hole and a contoured contact surface, the contoured contact surface being fit against an oppositely contoured inner surface of the hollow bulb portion;
a mounting bracket having a through hole and a T-shaped channel, the T-shaped channel slidingly receiving the T-shaped mounting extension of the air seal; and
a fastener having a head at one end and an opposite exposed threaded end receiving a nut thereon, the fastener extending through the through hole in the filler plate, through the through hole in the T-shaped mounting extension and through the through hole in the mounting bracket, wherein the exposed end comprises a recess shaped to receive a tool for holding the fastener while the nut is tightened on the exposed threaded end of the fastener to secure the air seal between the filler plate and the mounting bracket to retain the air seal in place within the T-shaped channel, wherein the fastener and nut are tigthtenable without accessing the head of the fastener.

2. The air seal assembly of claim 1, wherein the fastener is a threaded bolt.

3. The air seal assembly of claim 1, wherein the mounting bracket has a right-angle flange cross-section.

4. The air seal assembly of claim 1, wherein the through hole in the filler plate is countersunk to accommodate the head of the fastener and sized to receive the fastener.

5. The air seal assembly of claim 1, wherein the filler plate and the mounting bracket are each formed of a relatively rigid material, and wherein the bulb seal is formed of a resilient material, and wherein the arrangement of the fastener, filler plate, air seal and mounting bracket allows the air seal to be securely fastened to the bracket without causing damage to the resilient material of the air seal.

6. The air seal assembly of claim 1, wherein the fastener comprises a fastening pin having the head and a collar having a nut, and wherein the nut is configured to separate from the collar after the collar is tightened against the mounting bracket to a predetermined preload specification.

7. The air seal assembly of claim 1, wherein the recess is shaped to receive a hex key.

8. An air seal assembly for an aircraft control surface, the air seal assembly comprising:

an elongate air seal made of a resiliently deformable non-metallic material and having a monolithically formed body defining a deformable hollow bulb that is continuous in cross-section around a hollow space, a T-shaped mounting extension and an intermediate web connecting the T-shaped mounted extension to the hollow bulb, the elongate air seal having at least one through hole extending at least through the T-shaped mounting extension and the intermediate web;

a filler plate having a through hole and a contoured contact surface, wherein the filler plate is located within the hollow space of the hollow bulb and is shaped to be inserted into the hollow bulb through an open end of the hollow bulb of the elongate air seal, wherein the contoured contact surface contacts an oppositely contoured inner surface of the hollow bulb;

a mounting bracket having a retaining channel with an open outer side, the retaining channel having at least one end slidingly receiving the T-shaped mounting extension with the hollow bulb extending outward through the open outer side, the mounting bracket having an attachment flange extending transversely from the mounting channel; and a fastener having a head at one end and an opposite threaded end receiving a nut thereon, the fastener extending through the through hole in the filler plate, through the through hole in the elongate air seal and through the mounting bracket to retain the air seal in place within the channel, wherein the fastener and nut are tightenable without accessing the head of the fastener.

9. The air seal assembly of claim 8, wherein the attachment flange comprises a series of spaced apart slotted openings dimensioned to receive other fasteners for attaching the air seal assembly to an aircraft.

10. The air seal assembly of claim 8, wherein the at least one through hole in the elongate seal is located within about 0.3 to about 1.5 inches of an end of the elongate air seal.

11. The air seal assembly of claim 8, wherein the contoured contact surface is free from sharp edges where the contact surface contacts the inner surface of the seal.

* * * * *